United States Patent
Wang et al.

(10) Patent No.: US 10,208,801 B1
(45) Date of Patent: Feb. 19, 2019

(54) WHEEL HUB SEAL

(71) Applicant: CHU HUNG OIL SEALS INDUSTRIAL CO., LTD., Nantou (TW)

(72) Inventors: Sheng-Huang Wang, Nantou (TW); Shin-Chieh Huang, Nantou (TW)

(73) Assignee: CHU HUNG OIL SEALS INDUSTRIAL CO., LTD., Nantou (TW)

( * ) Notice: Subject to any disclaimer, the term of this patent is extended or adjusted under 35 U.S.C. 154(b) by 0 days.

(21) Appl. No.: 15/460,080

(22) Filed: Mar. 15, 2017

(30) Foreign Application Priority Data

Feb. 24, 2017 (TW) .............................. 106106352 A

(51) Int. Cl.
| | |
|---|---|
| *F16J 15/3232* | (2016.01) |
| *F16C 33/78* | (2006.01) |
| *B60B 27/00* | (2006.01) |
| *F16J 15/3208* | (2016.01) |
| *B60B 27/02* | (2006.01) |

(52) U.S. Cl.
CPC ...... *F16C 33/7823* (2013.01); *B60B 27/0073* (2013.01); *F16C 33/783* (2013.01); *F16J 15/3208* (2013.01); *F16J 15/3232* (2013.01); *B60B 27/02* (2013.01); *F16C 2326/02* (2013.01)

(58) Field of Classification Search
CPC .... F16J 15/3232; F16J 15/3248; F16J 15/322; F16J 15/3216
USPC ....................................... 277/349, 351, 353
See application file for complete search history.

(56) References Cited

U.S. PATENT DOCUMENTS

| | | | | |
|---|---|---|---|---|
| 3,479,728 A | * | 11/1969 | Micai ................... | F16J 15/3256 277/565 |
| 4,208,057 A | * | 6/1980 | Messenger ........... | F16J 15/3264 277/309 |
| 4,226,426 A | * | 10/1980 | Messenger ........... | F16J 15/3264 277/353 |
| 4,252,329 A | * | 2/1981 | Messenger ........... | F16J 15/3264 277/551 |
| 4,974,860 A | * | 12/1990 | Anzue ................... | F16J 15/164 277/351 |
| 5,004,248 A | * | 4/1991 | Messenger ........... | F16J 15/3256 277/351 |

(Continued)

FOREIGN PATENT DOCUMENTS

JP WO 2013081075 A1 * 6/2013 .......... F16C 33/7823

*Primary Examiner* — Kristina R Fulton
*Assistant Examiner* — L. Susmitha Koneru
(74) *Attorney, Agent, or Firm* — Ming Chow; Sinorica, LLC

(57) ABSTRACT

A wheel hub seal has an inner annular member. An outer side of the inner annular member is sleeved with an outer annular member. A passage is formed between the inner annular member and the outer annular member. An opening of the passage is provided with a second barrier. The second barrier has a fixed portion fixed to the outer annular member. The fixed portion extends toward the inner annular member to form a suspended flexible portion. An outer surface of the flexible portion is provided with a raised press portion. Thereby, when the wheel hub seal is mounted in a shaft hole of a hub, the press portion is compressed by the inner wall of the shaft hole to press the flexible portion to resiliently lean against the inner annular member to seal the passage, achieving the effect of blocking external silt.

7 Claims, 8 Drawing Sheets

(56) References Cited

U.S. PATENT DOCUMENTS

| | | | | |
|---|---|---|---|---|
| 5,201,528 A * | 4/1993 | Upper | F16J 15/3256 | 277/394 |
| 5,419,642 A * | 5/1995 | McLarty | F16C 33/7843 | 384/477 |
| 5,649,710 A * | 7/1997 | Kanda | F16J 15/3256 | 277/371 |
| 6,186,507 B1 * | 2/2001 | Oldenburg | F16J 15/3256 | 277/353 |
| 7,909,333 B2 * | 3/2011 | Greca | F16J 15/3264 | 277/349 |
| 8,439,363 B2 * | 5/2013 | Greca | F16J 15/3456 | 277/353 |
| 8,734,022 B2 * | 5/2014 | Dittmar | F16C 33/7813 | 384/480 |
| 8,864,139 B2 * | 10/2014 | Greca | F16J 15/447 | 277/409 |
| 2003/0209858 A1 * | 11/2003 | Maldera | F16C 33/7879 | 277/394 |
| 2016/0003302 A1 * | 1/2016 | Seno | F16J 15/3264 | 277/351 |
| 2016/0236509 A1 * | 8/2016 | Gull | B60B 27/0073 | |

* cited by examiner

WHEEL HUB SEAL

FIELD OF THE INVENTION

The present invention relates to a seal structure, and more particularly to a wheel hub seal.

BACKGROUND OF THE INVENTION

A conventional wheel hub seal has an inner annular member and an outer annular member fitted on the outer periphery of the inner annular member. A space is formed between the inner annular member and the outer annular member. A resilient barrier is provided in the space. One end of the resilient barrier is fixed to the outer annular member. Another end of the resilient barrier is resiliently pressed against the inner annular member. Thereby, when the outer annular member is rotated relative to the inner annular member, the outer annular member drives the resilient barrier to rub against the inner annular member at a high speed to create a boundary lubrication effect, thereby achieving the purpose of preventing oil leaks.

However, in order to allow the outer annular member to rotate relative to the inner annular member, the inner annular member and the outer annular member must be spaced a distance apart from each other. As a result, the external silt may intrude into the seal from the space to damage the seal. In view of this, a dust-proof structure is provided in the space. As an example, the space is provided with a rubber block or the like. But, it is still impossible to prevent the silt from entering the space. The rubber block suffers a lot of wear and tear to lose its function after the seal is used for a long time. Accordingly, the inventor of the present invention has devoted himself based on his many years of practical experiences to solve these problems.

SUMMARY OF THE INVENTION

The primary object of the present invention is to provide a wheel hub seal which can effectively block silt and has a better durability and reliability.

In order to achieve the aforesaid object, the wheel hub seal of the present invention comprises an inner annular member. The inner annular member has an inner annular wall. One side of the inner annular wall extends radially outwardly to form an inner side wall. An outer edge of the inner side wall is provided with a top portion. The wheel hub seal further comprises an outer annular member. The outer annular member is fitted on an outer periphery of the inner annular wall. The outer annular member has an outer annular wall parallel to the inner annular wall. One side of the outer annular wall extends radially inwardly to form an outer side wall corresponding to the inner side wall. The outer side wall is spaced apart from the inner side wall, so that a passage is formed between the inner side wall and the outer side wall. One end of the passage, close to the outer annular wall, is formed with an outer opening. Another end of the passage, close to the inner annular wall, is formed with an inner opening. The wheel hub seal further comprises a first barrier. The first barrier is disposed between the inner annular member and the outer annular member for sealing the inner opening of the passage. The wheel hub seal further comprises a second barrier made of an elastic material. The second barrier has a fixed portion. The fixed portion is fixed to the outer annular wall. The fixed portion extends toward the top portion to form a suspended flexible portion. The flexible portion is disposed across the outer opening of the passage and located close to an outer side of the top portion and spaced apart from the top portion, so that a space is formed between the top portion and the flexible portion. The flexible portion has an inner surface facing the top portion and an outer surface opposite the inner surface. The outer surface is provided with a raised press portion corresponding in position to the space. The press portion protrudes from an outer edge of the outer annular wall.

The fixed portion extends toward the top portion to form the suspended flexible portion. The flexible portion is disposed across the outer opening of the passage and located close to the outer side of the top portion. The space is defined between the inner surface of the flexible portion and the top portion. The outer surface of the flexible portion is provided with the press portion corresponding in position to the space. The press portion protrudes from the outer edge of the outer annular wall. When the wheel hub seal is mounted in a shaft hole of a wheel hub, the press portion will be compressed by an inner wall of the shaft hole to press the flexible portion, such that the flexible portion is resiliently pressed against the top portion to seal the outer opening of the passage. Thereby, the wheel hub seal can block external silt. The flexible portion is resiliently pressed against the top portion by the press portion. Even though the flexible portion suffers a lot of wear and tear, the flexible portion will continue to lean against the top portion with better reliability.

DETAILED DESCRIPTION OF THE PREFERRED EMBODIMENTS

Embodiments of the present invention will now be described, by way of example only, with reference to the accompanying drawings.

Figure 1:
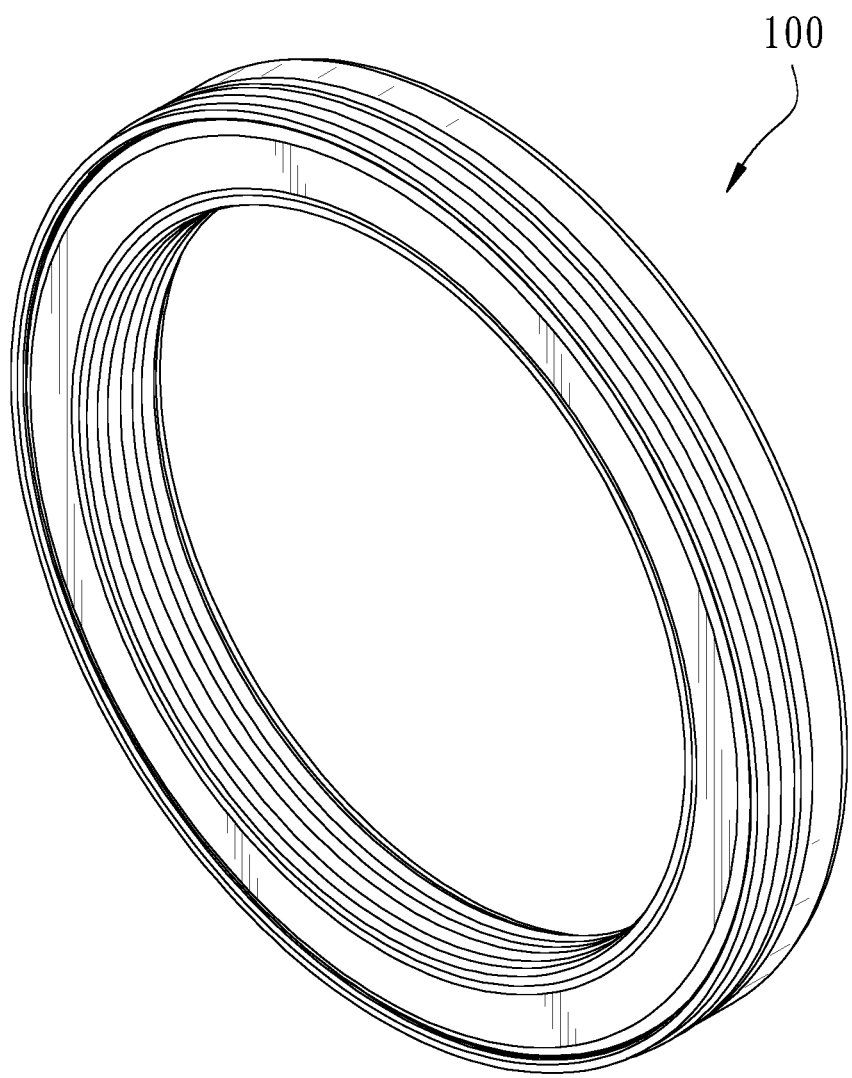
FIG. 1 is a perspective view in accordance with a preferred embodiment of the present invention.
Figure 2:
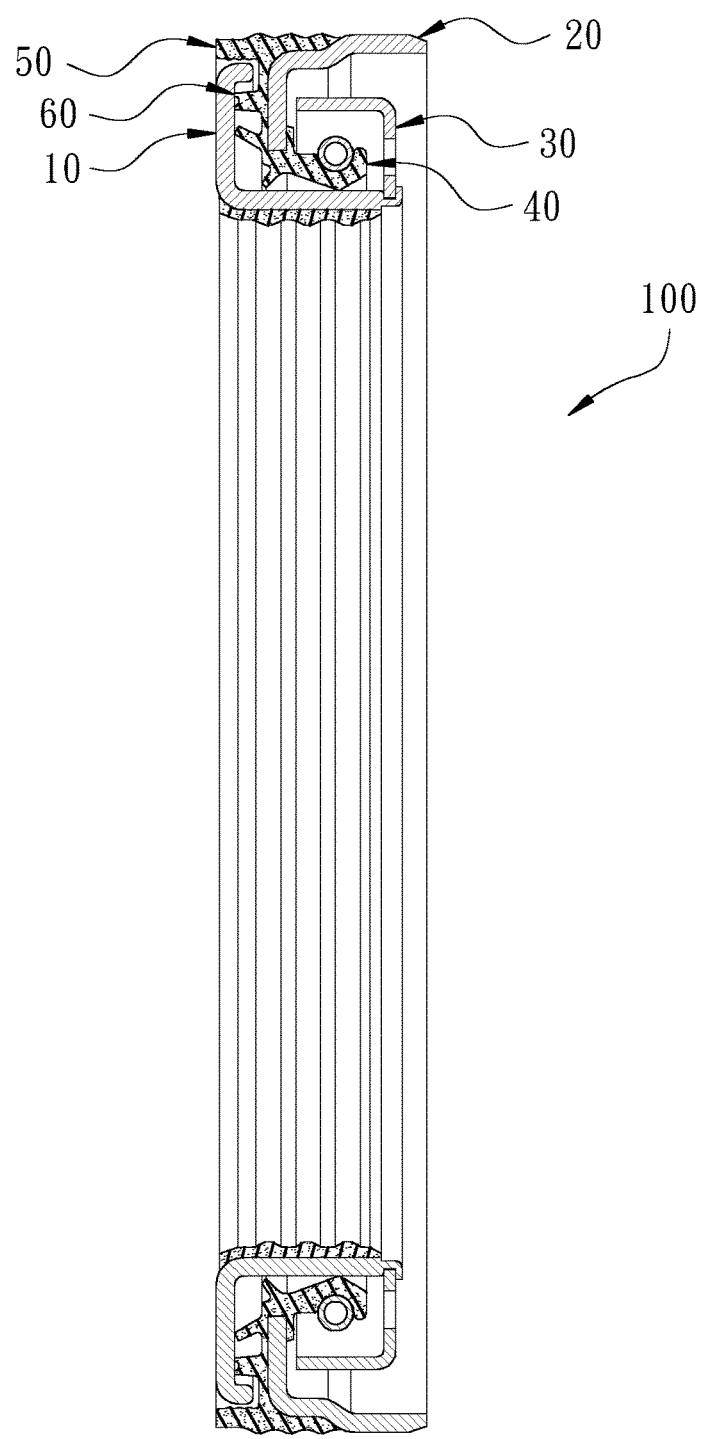
FIG. 2 is a sectional view in accordance with the preferred embodiment of the present invention.
Figure 3:
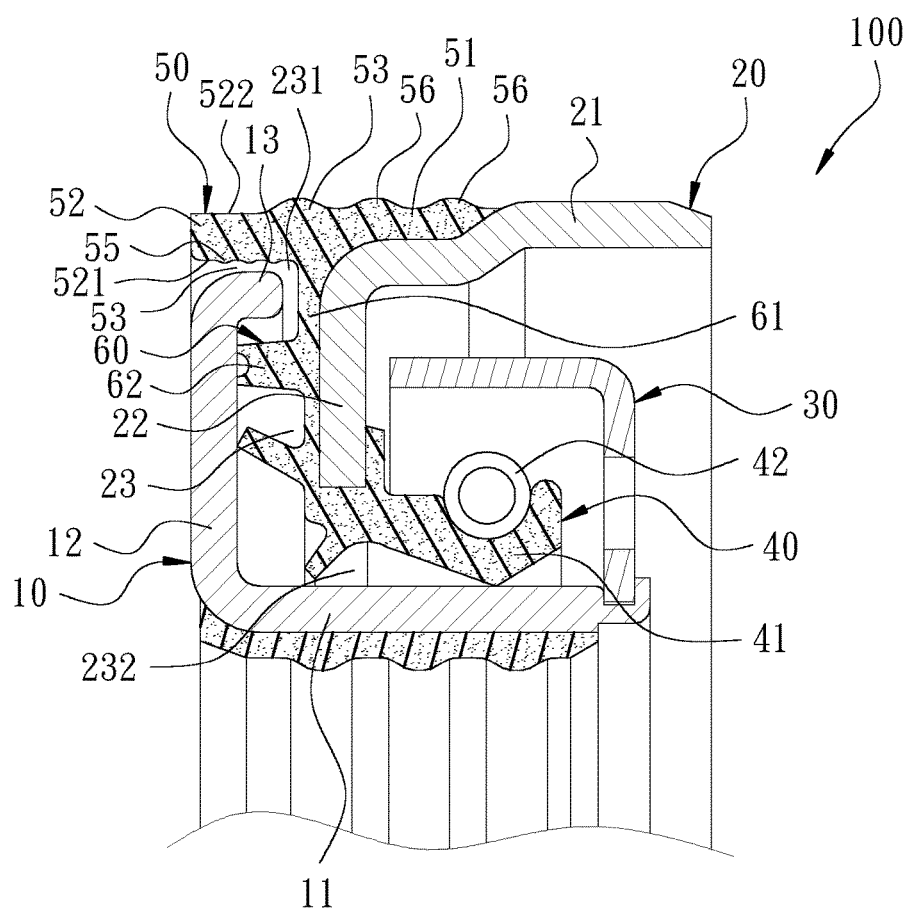
FIG. 3 is a partial enlarged view in accordance with the preferred embodiment of the present invention.

FIG. 1 is a perspective view in accordance with a preferred embodiment of the present invention. FIG. 2 is a sectional view in accordance with the preferred embodiment of the present invention. FIG. 3 is a partial enlarged view in accordance with the preferred embodiment of the present invention. The present invention discloses a wheel hub seal 100. The wheel hub seal 100 comprises an inner annular member 10, an outer annular member 20, an intermediate annular member 30, a first barrier 40, a second barrier 50, and a third barrier 60.

The inner annular member 10 has an inner annular wall 11. One side of the inner annular wall 11 extends radially outwardly to form an inner side wall 12. An outer edge of the inner side wall 12 is bent and extends to form a top portion 13.

The outer annular member 20 is fitted on the outer periphery of the inner annular wall 11. The outer annular member 20 has an outer annular wall 21 parallel to the inner annular wall 11. One side of the outer annular wall 21 extends radially inwardly to form an outer side wall 22 corresponding to the inner side wall 12. The outer side wall 22 is spaced apart from the inner side wall 12, so that a passage 23 is formed between the inner side wall 12 and the outer side wall 22. One end of the passage 23, close to the outer annular wall 21, is formed with an outer opening 231. Another end of the passage 23, close to the inner annular wall 11, is formed with an inner opening 232.

The intermediate annular member 30 is disposed between the inner annular wall 11 of the inner annular member 10 and the outer annular wall 21 of the outer annular member 20.

The first barrier 40 is disposed between the inner annular member 10 and the outer annular member 20 for sealing the inner opening 232 of the passage 23. In this embodiment, the first barrier 40 has a sealing lip 41. One end of the sealing lip 41 is coupled to the outer side wall 22. Another end of the sealing lip 41 is provided with a spring 42 and pressed against the inner annular wall 11 by the elasticity of the spring 42.

The second barrier 50 is made of an elastic material, such as rubber. The second barrier 50 has a fixed portion 51 which is fixed to the outer annular wall 21. The fixed portion 51 extends toward the top portion 13 to form a suspended flexible portion 52. The flexible portion 52 is disposed across the outer opening 231 of the passage 23 and located close to an outer side of the top portion 13 and spaced apart from the top portion 13, so that a space 53 is formed between the top portion 13 and the flexible portion 52. The flexible portion 52 has an inner surface 521 facing the top portion 13 and an outer surface 522 opposite the inner surface 521. The outer surface 522 of the flexible portion 52 is provided with a raised press portion 54 corresponding in position to the space 53. The press portion 54 protrudes from an outer edge of the outer annular wall 21. The inner surface 521 is provided with at least one pointed portion 55. An outer surface of the fixed portion 51 of the second barrier 50 is provided with a plurality of ribbed portions 56 thereon.

The third barrier 60 is disposed in the passage 23, and has a bottom 61 coupled to the outer side wall 22. The bottom 61 is provided with at least one stop portion 62. A free end of the stop portion 62 leans against the inner side wall 12.

Figure 4:
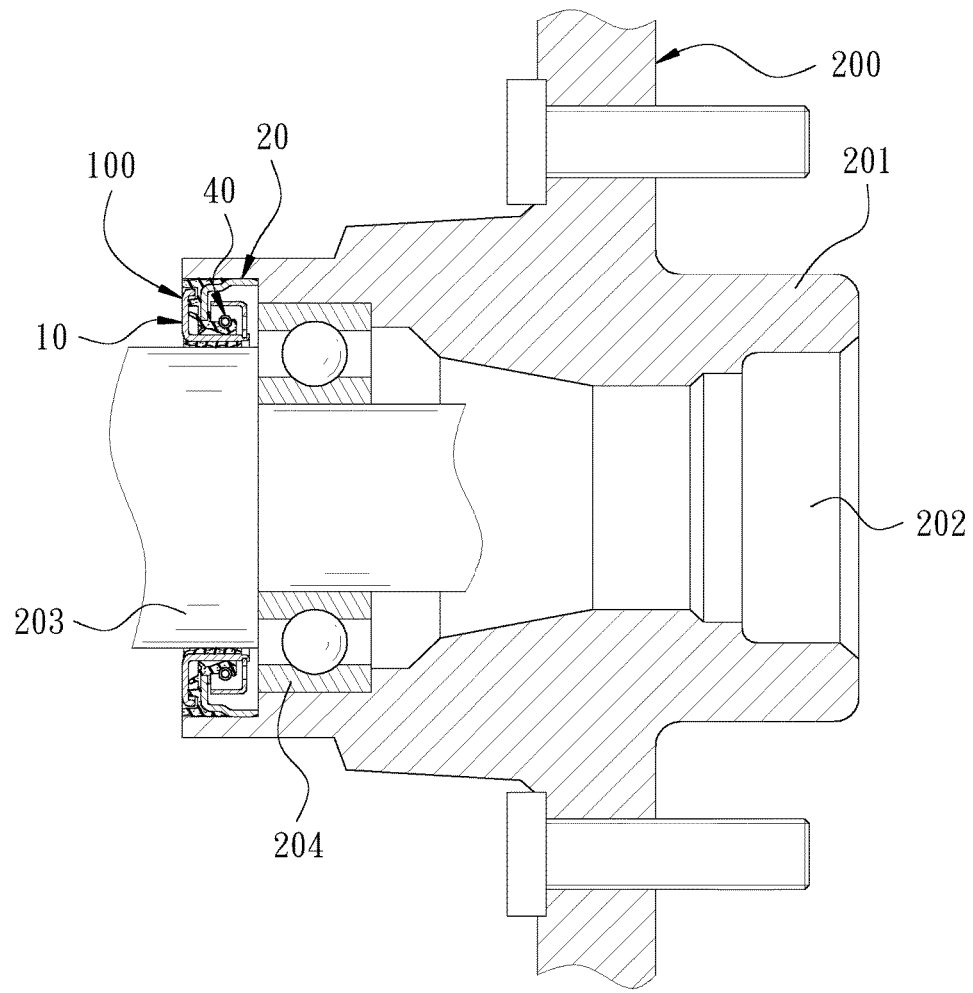
FIG. 4 is a schematic view in accordance with the preferred embodiment of the present invention when in use.

FIG. 4 is a schematic view in accordance with the preferred embodiment of the present invention when in use. The wheel hub seal 100 is mounted to a wheel hub 200. The wheel hub 200 comprises a seat body 201. The center of the seat body 201 has a shaft hole 202, allowing a wheel shaft 203 to pass therethrough. A bearing 204 is provided between the wheel shaft 203 and the shaft hole 202, so that the seat body 201 can be rotated relative to the wheel shaft 203 through the bearing 204. The wheel hub seal 100 is disposed in the shaft hole 202, and is located at an outer side of the bearing 204. The inner annular member 10 is fitted on the wheel shaft 203. The outer annular member 20 leans against the inner wall of the shaft hole 202. Thereby, when the seat body 201 is rotated to link the outer annular member 20 to turn relative to the inner annular member 10, the outer annular member 20 drives the first barrier 40 to rub against the inner annular member 10 at a high speed to provide a boundary lubrication effect, achieving the purpose of preventing an oil leak.

Figure 5:
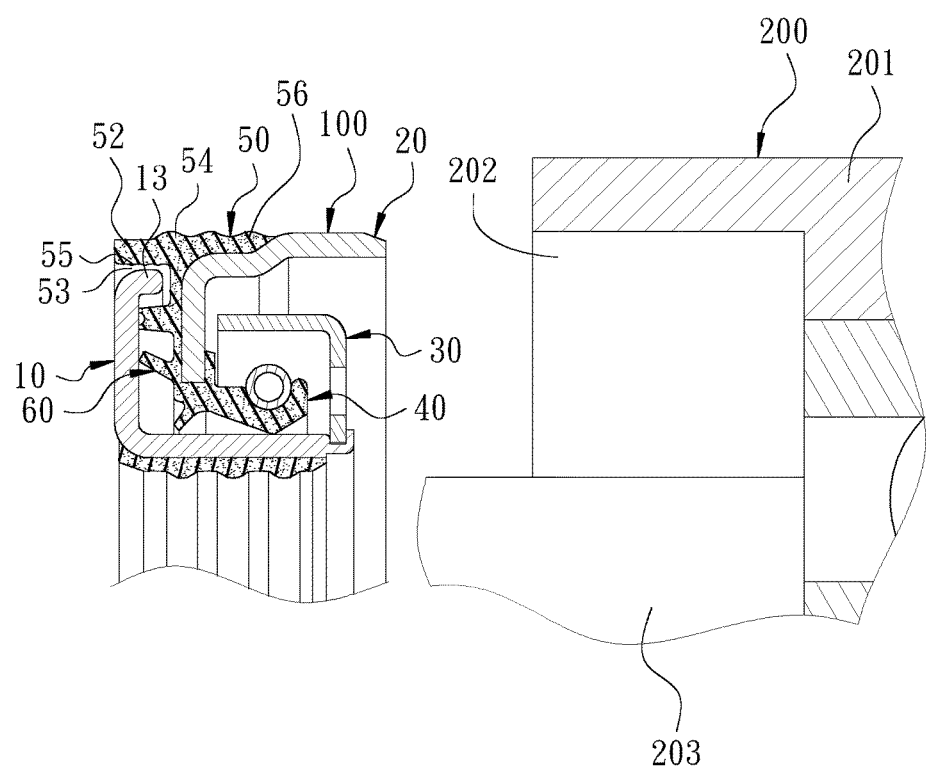
FIG. 5 is a schematic view of the operation of the preferred embodiment of the present invention, showing the wheel hub seal before mounted in the shaft hole.
Figure 6:
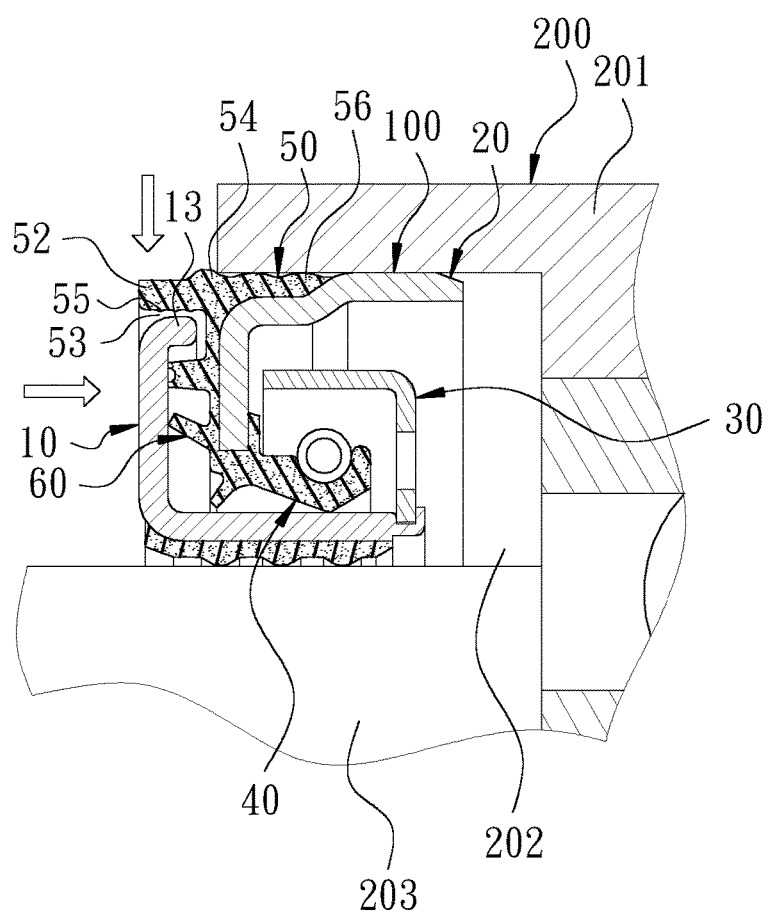
FIG. 6 is a schematic view of the operation of the preferred embodiment of the present invention, showing that the wheel hub seal is being mounted in the shaft hole.
Figure 7:
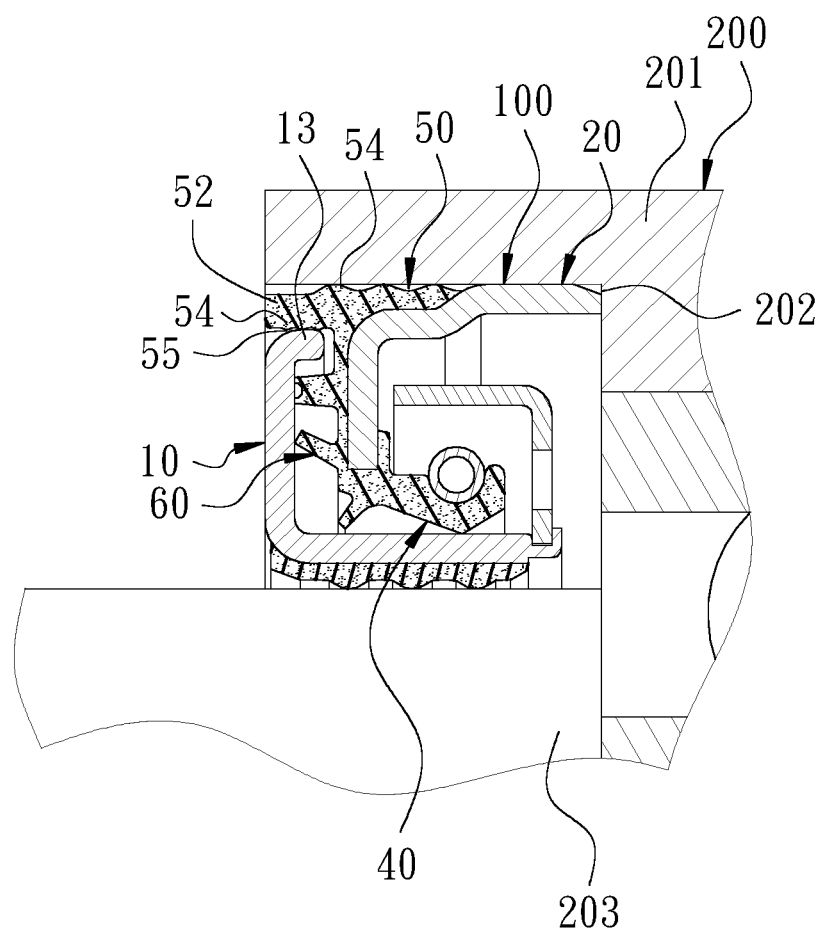
FIG. 7 is a schematic view of the operation of the preferred embodiment of the present invention, showing that the wheel hub seal after mounted in the shaft hole.

FIG. 5, FIG. 6, and FIG. 7 are schematic views showing the operation of the preferred embodiment of the present invention. When the wheel hub seal 100 is installed, as shown in FIGS. 5 to 7 in sequence, the wheel hub seal 100 is pushed into the shaft hole 202. As shown in FIG. 5, when the user has not yet pushed the wheel hub seal 100 into the shaft hole 202 of the hub 200, the space 53 between the flexible portion 52 and the top portion 13 is kept. As shown in FIG. 6, the wheel hub seal 100 is plugged into the shaft hole 202 by the user. Because the outer edge of the inner side wall 12, close to the outer opening 231 of the passage 23, is bent toward the outer side wall 22 and extends to form the top portion 13, the fixed portion 51 extends toward the top portion 13 to form the suspended flexible portion 52, the flexible portion 52 is disposed across the outer opening 231 of the passage 23 and located close to the outer side of the top portion 13, the space 53 is defined between the inner surface 522 of the flexible portion 52 and the top portion 13, the outer surface 522 of the flexible portion 52 is provided with the press portion 54 corresponding in position to the space 53, and the press portion 54 protrudes from the outer edge of the outer annular wall 21, the press portion 54 will be compressed by the inner wall of the shaft hole 202 to press the flexible portion 52 to move in the direction of the top portion 13. As shown in FIG. 7, when the wheel hub seal 100 is fully plugged into the shaft hole 202, the inner surface 521 of the flexible portion 52 is resiliently pressed against the top portion 13 to seal the outer opening 231 of the passage 23 so as to block external silt. It is worth mentioning that the pointed portion 55 provided on the inner surface 521 of the flexible portion 52 decreases the contact area between the flexible portion 52 and the top portion 13 to reduce the frictional resistance. Because the flexible portion 52 is resiliently pressed against the top portion 13 by the pressing of the press portion 54, that is, the flexible portion 52 has a predetermined force to move in the direction of the top portion 13. Even though the pointed portion 55 suffers a lot of wear and tear, the pointed portion 55 will continue to lean against the top portion 13 with better reliability. In addition, the arrangement of the ribbed portion 56 allows the user to easily insert the wheel hub seal 100 into the shaft hole 202.

Figure 8:
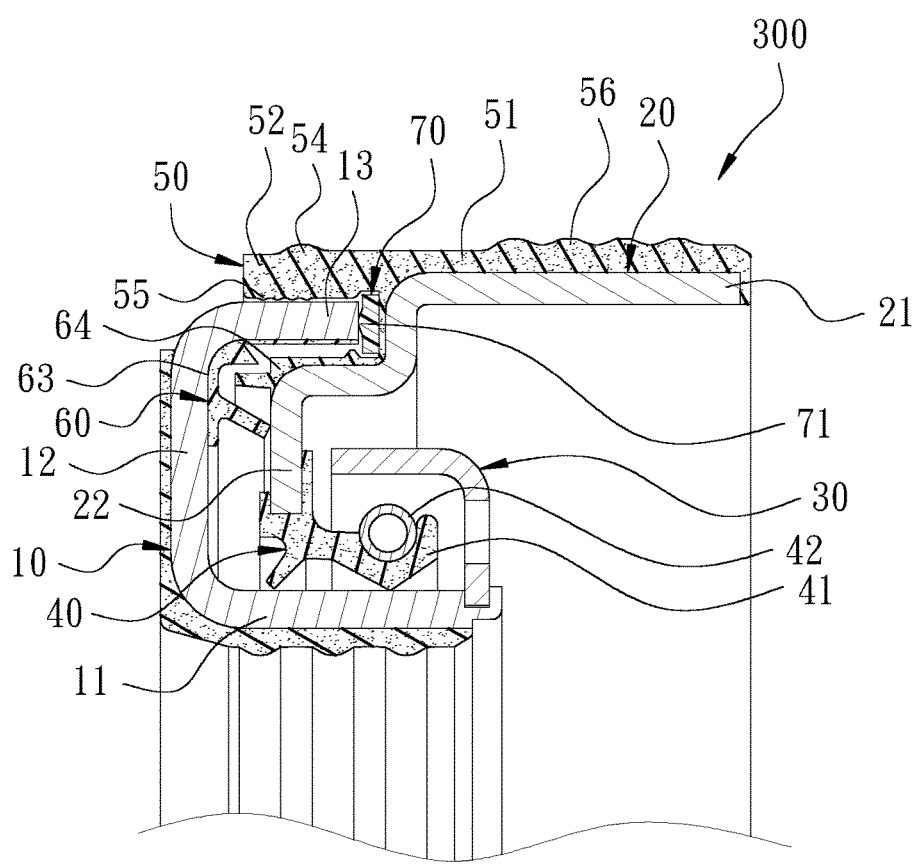
FIG. 8 is a partial enlarged sectional view in accordance with another embodiment of the present invention.

FIG. 8 is a partial enlarged sectional view in accordance with another embodiment of the present invention. The wheel hub seal 100 of this embodiment is substantially similar to the aforesaid preferred embodiment with the exceptions described below. The wheel hub seal 100 further comprises a wear ring 70 made of a low friction material, such as nylon. The wear ring 70 is disposed in the outer opening 231 of the passage 23. One side of the wear ring 70 is fixed to the outer side wall 22 so that the wear ring 70 can rotate along with the outer annular member 20. Another side of the wear ring 70 leans against the top portion 13. Wherein, the side of the wear ring 70, facing the top portion 13, is further provided with an annular protrusion 71 to decrease the contact area between the wear ring 70 and the top portion 13 so as to reduce the frictional resistance. The third barrier 60 is disposed in the passage 23, and has a first bumpy portion 63 disposed on the inner side wall 12 and a second bumpy portion 64 disposed on the outer side wall 22. An uneven passage is formed between the first bumpy portion 63 and the second bumpy portion 64. Thereby, the wear ring 70 and the third barrier 60 provides a further dust-proof effect.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A wheel hub seal comprising:
an inner annular member;
the inner annular member comprising an inner annular wall and an inner side wall;
the inner side wall being formed by one side of the inner annular wall extending radially outwardly;
an outer annular member;
the outer annular member being fitted on an outer periphery of the inner annular wall;
the outer annular member comprising an outer annular wall and an outer side wall;
the outer annular wall being located parallel to the inner annular wall;
the outer side wall being formed by one side of the outer annular wall extending radially inwardly;
the outer side wall corresponding to the inner side wall;
a passage;
the passage being formed in between the inner side wall and the outer side wall by the outer side wall being spaced apart from the inner side wall;
the passage comprising an outer opening formed on one end thereof and an inner opening formed on the other end thereof;
the outer opening being located adjacent to the outer annular wall;
the inner opening being located adjacent to the inner annular wall;
a first barrier;
the first barrier being disposed in between the inner annular member and the outer annular member;
the first barrier sealing the inner opening;
the inner side wall comprising a top portion;
the top portion being located adjacent to the outer opening;
a second barrier;
the second barrier being made of an elastic material;
the second barrier comprising a fixed portion, a suspended flexible portion and a raised press portion;
the fixed portion being fixed to the outer annular wall;
the suspended flexible portion being formed by the fixed portion extending toward the top portion;
the suspended flexible portion being disposed across the outer opening;
the suspended flexible portion being located adjacent to an outer side of the top portion;
a space;
the space being formed in between the top portion and the suspended flexible portion by the suspended flexible portion being spaced apart from the top portion;
the suspended flexible portion comprising an inner surface and an outer surface;
the inner surface facing the top portion;
the outer surface being opposite the inner surface;
the raised press portion being provided on the outer surface of the suspended flexible portion;
the raised press portion corresponding in position to the space;
the raised press portion protruding with respect to an outer edge of the outer annular wall;
in response to the raised press portion being compressed, the suspended flexible portion being resiliently pressed so as to render the inner surface of the suspended flexible portion contacting against the top portion to seal the outer opening;
the second barrier comprising a plurality of pointed portions;
the plurality of pointed portions being provided on the inner surface of the suspended flexible portion; and
in response to the inner surface of the suspended flexible portion contacting against the top portion, a contact area between the suspended flexible portion and the top portion being decreased via the plurality of pointed portions.

2. The wheel hub seal as claimed in claim 1 comprising:
in response to the contact area being decreased, a frictional resistance between the suspended flexible portion and the top portion being reduced.

3. The wheel hub seal as claimed in claim 1 comprising:
the top portion being formed by an outer edge of the inner side wall being bent and extending toward the outer side wall.

4. The wheel hub seal as claimed in claim 1 comprising:
a wear ring;
the wear ring being disposed in the outer opening;
one side of the wear ring being fixed to the outer side wall;
the wear ring being capable of rotating along with the outer annular member; and
the other side of the wear ring leaning against the top portion.

5. The wheel hub seal as claimed in claim 4 comprising:
the wear ring comprising an annular protrusion; and
the annular protrusion being provided on the other side of the wear ring.

6. The wheel hub seal as claimed in claim 1 comprising:
the second barrier comprising a plurality of ribbed portions; and
the plurality of ribbed portions being provided on an external surface of the fixed portion.

7. The wheel hub seal as claimed in claim 1 comprising:
a third barrier;
the third barrier being disposed in the passage;
the third barrier comprising a bottom and at least one stop portion;
the bottom being coupled to the outer side wall;
the at least one stop portion being provided on the bottom; and
a free end of the stop portion leaning against the inner side wall.

* * * * *